United States Patent
MacMaster

(10) Patent No.: US 7,710,623 B2
(45) Date of Patent: May 4, 2010

(54) SECURITY HOLOGRAM, METHOD OF RECORDING SAME, AND METHOD OF USING SAME WHEREIN THE HOLOGRAPHIC IMAGING INCLUDES A SINGLE COHERENT BEAM OF ELECTROMAGNETIC RADIATION IN COMBINATION WITH A LLOYD'S MIRROR TO PROVIDE BOTH REFERENCE AND OBJECT BEAMS

(75) Inventor: Steven William MacMaster, Springfield, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 188 days.

(21) Appl. No.: 11/841,139

(22) Filed: Aug. 20, 2007

(65) Prior Publication Data

US 2008/0049281 A1    Feb. 28, 2008

Related U.S. Application Data

(60) Provisional application No. 60/839,348, filed on Aug. 22, 2006.

(51) Int. Cl.
  *G03H 1/12* (2006.01)
(52) U.S. Cl. .................................................. 359/12
(58) Field of Classification Search ................ 359/1–35
  See application file for complete search history.

(56) References Cited

U.S. PATENT DOCUMENTS

| | | | | |
|---|---|---|---|---|
| 5,781,317 | A * | 7/1998 | Kawazoe et al. | 359/12 |
| 6,994,938 | B2 * | 2/2006 | Taniguchi | 430/1 |
| 2002/0163678 | A1 | 11/2002 | Haines et al. | |

FOREIGN PATENT DOCUMENTS

GB         2317237 A      9/1996

* cited by examiner

*Primary Examiner*—Stephone B Allen
*Assistant Examiner*—Jennifer L. Doak
(74) *Attorney, Agent, or Firm*—John R. Dodd; Angela J. Grayson

(57) ABSTRACT

A security hologram is disclosed that is invisible to a human eye or to various optical detectors until the hologram is optically coupled to a suitable modifier (e.g., a prism). Also disclosed is a method of recording the security hologram and a method of using the hologram in security applications to establish authenticity of article(s).

3 Claims, 2 Drawing Sheets

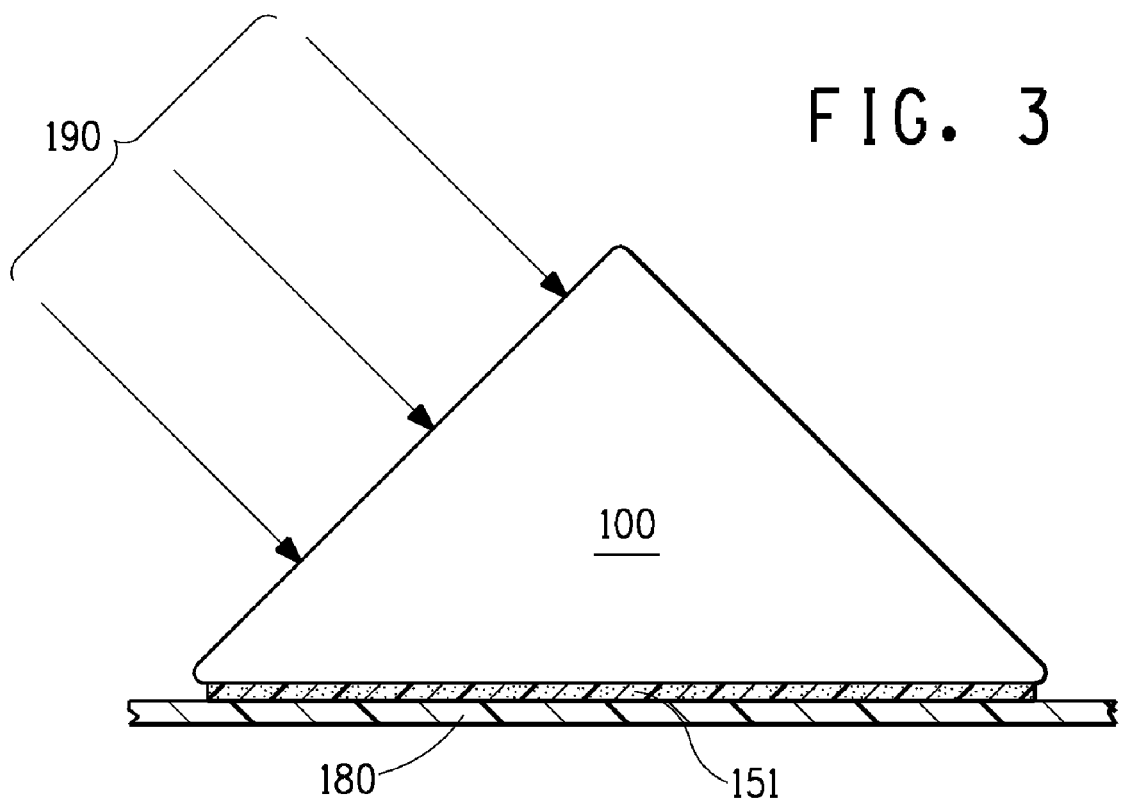

SECURITY HOLOGRAM, METHOD OF RECORDING SAME, AND METHOD OF USING SAME WHEREIN THE HOLOGRAPHIC IMAGING INCLUDES A SINGLE COHERENT BEAM OF ELECTROMAGNETIC RADIATION IN COMBINATION WITH A LLOYD'S MIRROR TO PROVIDE BOTH REFERENCE AND OBJECT BEAMS

BACKGROUND OF THE INVENTION

Holograms that afford covert image(s) which are normally hidden and not viewable but which can be viewed in special circumstances and/or with special equipment are very useful in security applications, such as verifying authenticity of a product or a document.

Holographic imaging of a photosensitive film with reference and object beams being incident on the photosensitive film from air to produce a covert image that is normally hidden and scrambled is described in US Patent Publication 2002/0163678 and in GB 2317237A. The covert image is viewable as a recognizable image only with use of a suitable overlay plate, such as a lenticular plate. The hologram is improperly referenced and improperly reconstructed without inclusion of an overlay plate. Such improper reconstruction of the hologram without the overlay plate may equate to a fuzzy image that would lead one to believe that a security hologram is present.

The present invention includes a prism (or other element, e.g., a physical optic or a HOE) to reference a hologram. During reconstruction without the prism the image cannot be reconstructed, resulting in an invisible image. There is a need for a method utilizing an invisible security hologram until referencing occurs with the use of a prism. The present invention fulfills such need.

SUMMARY OF THE INVENTION

The invention is directed to a security hologram comprising a covert holographic image that is invisible and not observable by a user in the absence of optical coupling of the hologram to an optical modifier but which may be made visible and observable by optical coupling of the hologram to the optical modifier during reconstruction of the image. The invention is further directed to a method for making a security hologram comprising a covert image of an object, said method comprising the steps of:
  a) placing the object in contact with a first face of a prism, placing a first photosensitive film in contact with a second face of the prism, and holographically exposing the object, the prism and the first photosensitive film to a first coherent beam of electromagnetic radiation that is incident upon a third face of the prism wherein the first photosensitive film results in a first exposed photosensitive film having a H1 hologram of the object;
  b) curing the first exposed photosensitive film with electromagnetic radiation resulting in a first cured photosensitive film and removing the object from being proximate to the prism; and
  c) placing a second photosensitive film in contact with the first face of the prism, exposing the first cured photosensitive film, the prism and the second photosensitive film to a second coherent beam of electromagnetic radiation that is incident upon the third face of the prism wherein the second photosensitive film results in a second exposed photosensitive film having a H2 hologram, and curing the second photosensitive film with electromagnetic radiation resulting in a second cured photosensitive film.

The invention is further directed to a method for establishing the authenticity of an article containing a security hologram, said method comprising the steps of:
  (a) providing a security hologram on an article to be authenticated, the security hologram having a surface and comprising a covert image of at least one object, wherein the covert image appears invisible and unobservable by a user in the absence of optical coupling of the hologram to an optical modifier;
  (b) coupling an optical modifier to the surface of the security hologram;
  (c) illuminating the security hologram through the optical modifier with at least partially collimated light having a spectral bandwidth, wherein the spectral bandwidth of the at least partially collimated light overlaps the spectral bandwidth of the security hologram; and
  (d) establishing the article bearing the security hologram to be authentic when the covert image becomes observable upon illumination with the at least partially collimated light in step (c) with the light passing first through the prism and subsequently being incident upon the security hologram.

BRIEF DESCRIPTION OF THE DRAWINGS

FIG. 3 illustrates replication of a H2 holographic image.

DETAILED DESCRIPTION

One embodiment of the invention is a method for making a security hologram comprising a covert image of an object. The covert image of the hologram remains covert and is invisible and not observable through users such as human eyes or various optical detectors until the hologram becomes visible during reconstruction of the security hologram when optically coupled to a suitable optical modifier. Some examples of optical modifiers include a holographic optical element, ball lens, and prisms of any shape. With such suitable optical coupling, the covert image becomes overt with this optical coupling and is visible and observable by the users. Visible and observable includes being seen with the human eye or detectable by optical or electronic means. In various embodiments, the image is visible and observable by reconstruction using IR or UV wavelengths of electromagnetic radiation.

Figure 1:
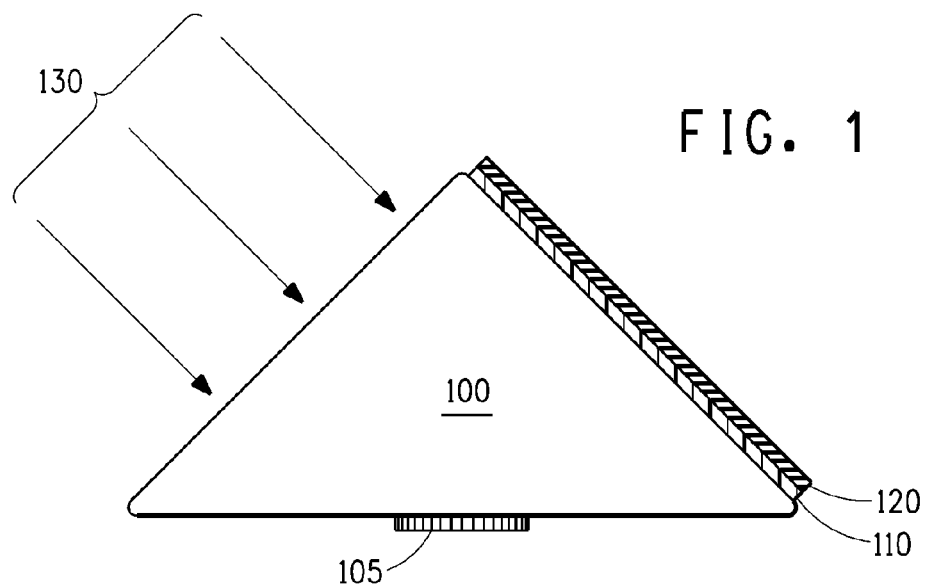
FIGS. 1-2 illustrate holographic imaging of an object.

In one embodiment, holographic imaging of an object (e.g., a quarter coin) that can be a covert image is effected using a prism as an optical modifier as illustrated in FIG. 1. As shown in FIG. 1, a prism 100 is placed on top of an object 105 (e.g., quarter) to be holographically imaged such that one surface of the object is adjacent to a first face of the prism. A first photosensitive film 110 that is suitable for holographic imaging is placed adjacent to a second face of the prism. Optionally, a black layer 120 that will absorb electromagnetic radiation incident upon it can be placed adjacent to the first photosensitive film as shown in FIG. 1. During holographic imaging in an initial step, a coherent beam 130 of electromagnetic radiation (examples may include, visible light, UV or IR) is made to be incident upon a third face of the prism as shown in FIG. 1. The coherent beam 130 is a single beam that becomes both object and reference beams for holographic imaging once the beam is inside the prism. Results at the end of the above processing (Step 1 of a three or four step process)

is a H1 holographic image that is recorded in the first photosensitive film layer that is now an exposed first photosensitive film layer after the coherent beam has illuminated the photosensitive film layer.

Figure 2:
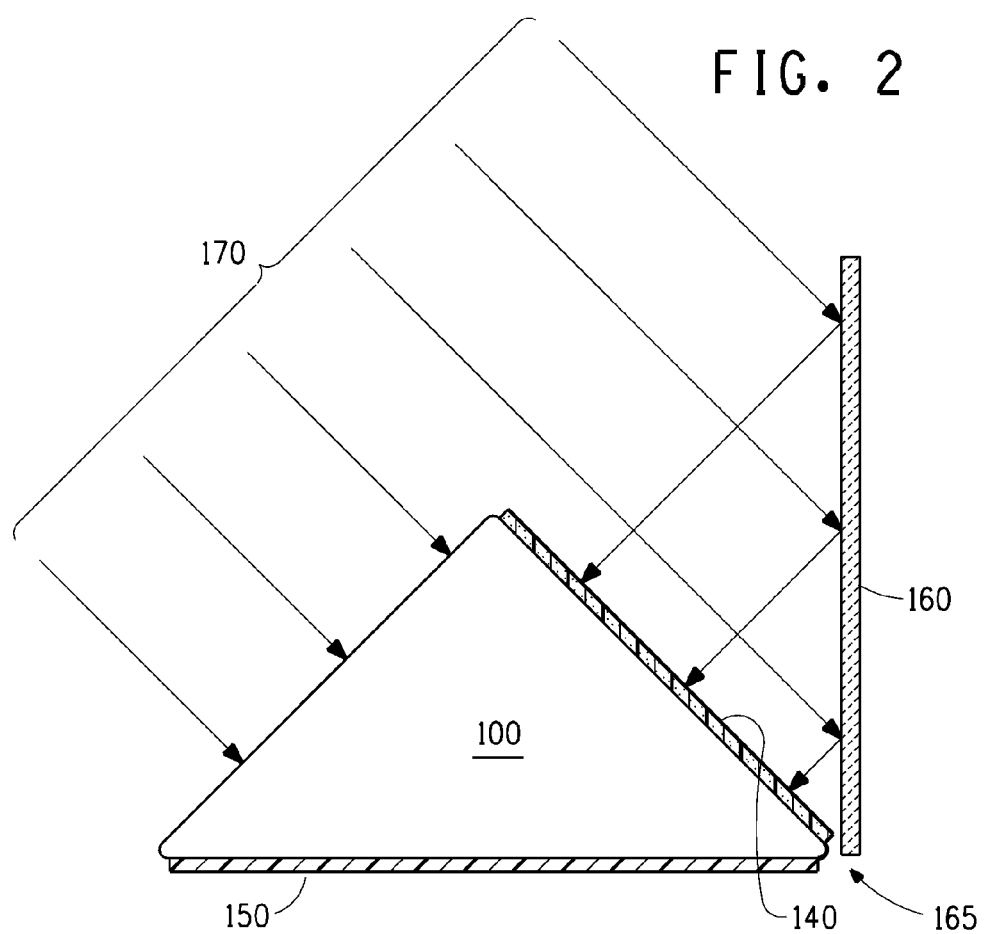

In Step 2 of the three/four-step process, the black layer, if present, is removed, and the exposed first photosensitive film layer is cured with ultraviolet light that eliminates essentially all remaining photosensitivity (e.g., in case of a photopolymer film, to photopolymerize essentially all remaining monomer and convert any remaining monomer to photopolymer). Exposure of first photosensitive film 120 and subsequent curing of exposed photosensitive film 130 transforms this film into exposed and cured film 140 (as shown in FIG. 2 infra). In the case where the first photosensitive film is a photopolymer, the exposed and cured film 140 is a photopolymerized film. Finally, the object is removed from being adjacent and proximate to the prism.

In Step 3 of the three/four-step process, further holographic imaging is done to produce a H2 hologram from the H1 hologram. (As used herein, the terms H1 and H2 holograms are given their usual meanings as well-known to holographers and as described in various references, such as the following: Hariharan, P, *Optical Holography—Principles, Techniques, and Applications*, New York: Cambridge University Press, 1996, pages 29-33 and in Klein, Arno, *Dispersion Compensation for Reflection Holography*. Masters Thesis at MIT, 1996, pages 79-82. FIG. 2 illustrates Step 3 of the three/four-step process. As illustrated in FIG. 2, the exposed and cured film 140 that contains a H1 hologram and holographic image of the object 105 is adjacent to one face of the prism 100. A second photosensitive film (e.g., holographic recording film) 150 is placed adjacent to a second face of the prism 100. Optionally, a mirror (e.g., Lloyd's mirror) 160 is adjacent to one vertex 165 of the prism 100 and optically coupled to the prism 100. Coherent electromagnetic radiation (e.g., visible, UV or IR) beam 170 is then directed to a third face of the prism as shown in FIG. 2. As indicated in FIG. 2, beam 170 is an expanded coherent beam such that part of this beam is incident upon the prism as an reference beam and part of this beam is incident upon the mirror, where it is reflected and then become incident upon the exposed and cured film 140 containing the H1 hologram and holographic image prior to entering the prism 100 as an object beam from another side of the prism as shown in this figure. Interference of the resulting reference and object beams produces a H2 holographic image of the object 105 that is recorded in the second photosensitive film 150 during this Step 3 holographic imaging step. The photosensitive film 150, following exposure, becomes an exposed photosensitive film 151 (see FIG. 3) optionally, the exposed film may be converted to a cured film by exposure to electromagnetic radiation (e.g., UV), and optionally heat processed. In the case where the second photosensitive film is a photopolymer, the exposed and optionally cured film is a photopolymerized film.

As an alternative to holographic imaging with use of a single expanded beam and mirror as shown in FIG. 2, a beam splitter can be used in place of the mirror to effect the holographic imaging for Step 3.

Optional Step 4 of this process involves the use of the H2 hologram made in Step 3 for replicating the H2 using a suitable photosensitive film (e.g., replicating photopolymer film). Step 4 is illustrated in FIG. 3. The exposed and cured film 140 is first removed from the second face of prism 100. The exposed film 151 optionally cured containing the H2 holographic image is adjacent to the first face of prism 100. A third photosensitive film (e.g., photopolymer replication film) 180 is placed adjacent to film 151 as shown in FIG. 3. During holographic imaging, a coherent beam 190 of electromagnetic radiation (e.g., visible light) is used to illuminate the third face of the prism 100 as shown in FIG. 3 to effect replication.

Imaging of photosensitive layer(s) to create holograms can be effected using coherent electromagnetic radiation, which includes visible, ultraviolet and infrared regions of the electromagnetic spectrum. In one embodiment, electromagnetic radiation in the visible region is used. In another embodiment, ultraviolet radiation is used. In yet another embodiment, infrared radiation is used.

The H1, H2, and replicated holograms are special holograms in which the holographic properties are confined to the internal angles of the respective film planes. The holograms are examples of evanescent holograms wherein information contained therein is confined in resonance within the film planes of the holograms. The information contained within these holographic images cannot be accessed by electromagnetic radiation without the use of optical modifiers as mentioned above. Therefore, the information contained within the holograms can be hidden or secret and be accessible only through special means such as the optical modifier that it was made with, for example the prism as described hereinabove. The holograms are useful as security holograms since information is invisible and hidden as covert holographic image(s) until the hologram is made accessible using the special means.

The method according to the invention for establishing the authenticity of an article containing a security hologram may be applied to many articles. Suitable articles include, but are not limited to, credit cards, passports, driver's licenses, currency, and packaged articles (e.g., a compact disk with computer software).

EXAMPLES

Example 1

A H1 was holographically recorded using a quarter (coin, US currency) that was secured to a 4"×5" glass plate using Norland NOA-61 Optical Adhesive (Norland Products, 2540 Route 130, Suite 100, Cranbury, N.J., USA). The face (longest of the three sides side) of a right-angle prism, Edmund OpticsP32-551 30 mm right-angle prism (Edmund Optics, 101 East Gloucester Pike, Barrington, N.J., USA), was secured to the center area of another glass plate using NOA-61. The exposed area of the glass plate around the prism was masked as well as the sides of the prism. A piece of holographic recording film, DuPont HRF-700×318-2, a 20 μm panchromatic holographic mastering film with a barrier layer (DuPont, 1007 Market Street, Wilmington, Del., USA), was hand-laminated to one leg of the prism. A black absorbing film was optically coupled to the air-side of the film using several drops of Cargille Immersion Liquid 5095 (Cargille Laboratories, Inc., 55 Commerce Road, Cedar Grove, N.J., USA). The glass plate with the quarter attached was then optically coupled to the prism/glass plate on the opposite side of the face. This stack was placed into a holder and exposed to 30 mJ coherent 514 nm laser light from an argon ion laser through the other prism leg normal incidence to said leg. After exposure, the plate containing the quarter and the black absorber were removed. The exposed HRF-700×318-20 film was optically stopped by a 100 mJ exposure to a UV-A extended light-source.

A H2 was then recorded by laminating a holographic replication film, DuPont HRF-600×130-7, a 7 μm transmission replication film with a black absorbing base, to the glass plate opposite the prism face. The plate was placed into the holder of a Lloyd's mirror recording set-up and exposed through both legs of the prism at incidence normal using the 514 nm coherent laser-line of an argon ion laser. Exposure was 20 mJ and then UV stopped as described. The film was post-exposure processed by heating for two hours at 150° C. The black absorbing base was removed and the processed hologram was laminated with a pressure-sensitive adhesive, 3M-8141 (3M, 3M Center, Saint Paul, Minn., USA) to a 4"×5" glass plate for evaluation.

The evaluation of the hologram was completed by illuminating the hologram with a variety of light sources at various angles both with and without a prism. Without a prism, the hologram was illuminated using a white broadband extended source, a white broadband point source and a 520 nm green LED. In all conditions the holographic image of the quarter was neither visible nor recognizable. The evaluation with a prism was completed by optically coupling a prism like the prism used for recording the hologram by using a couple of drops of water as a wetting fluid. Using the same light sources, the holographic image of the quarter was visible and recognizable when the light-source was incident on either prism leg at any angle towards said leg looking through either leg as well as from the back prism face side. The results are compiled in Table 1.

TABLE 1

| Illumination Source | Prism | Evaluation |
| --- | --- | --- |
| White Extended Source | No | Neither visible nor recognizable |
| White Point Source | No | Neither visible nor recognizable |
| Green LED | No | Neither visible nor recognizable |
| White Extended Source | Yes | Visible and recognizable |
| White Point Source | Yes | Visible, sharp, and recognizable |
| Green LED | Yes | Visible, sharp, 3D, and recognizable |

Example 2

Prophetic

The example demonstrates the ability to mass-produce H3 copies from an H2. The H2 will be recorded in the same manner as described in Example 1, except that the choice of holographic recording film for the H2 will be DuPont HRF-750-353-11, an 11 μm mastering film with a barrier layer. After recording, the film will be only UV stopped, no post-exposure heating. The hologram will then be laminated to a 4"×5" glass plate and encapsulated using the Norland Optical Adhesive to another 4"×5" glass plate. Another prism will be secured to the outside of this glass plate by means described above. Now, the hologram can be replicated into the HRF-600×130-7 the standard manual means by 514 nm laser exposure through one leg of the prism or replicated by an automated system.

Example 3

Prophetic

A H1 is holographically recorded using a quarter (coin, US currency or other object) secured to a 4"×5" glass plate using Norland NOA-61 Optical Adhesive (Norland Products, 2540 Route 130, Suite 100, Cranbury, N.J., USA). The face (longest of the three sides side) of a right-angle prism, Edmund OpticsP32-551 30 mm right-angle prism (Edmund Optics, 101 East Gloucester Pike, Barrington, N.J., USA), is secured to the center area of another glass plate using NOA-61. The exposed area of the glass plate around the prism is masked as well as the sides of the prism. A piece of holographic recording film, DuPont HRF-700×318-2, a 20 μm panchromatic holographic mastering film with a barrier layer (DuPont, 1007 Market Street, Wilmington, Del., USA) (or other UV sensitive film), is hand-laminated to one leg of the prism. A black absorbing film is optically coupled to the air-side of the film using several drops of Cargille Immersion Liquid 5095 (Cargille Laboratories, Inc., 55 Commerce Road, Cedar Grove, N.J., USA). The glass plate with the quarter attached is then optically coupled to the prism/glass plate on the opposite side of the face. This stack is placed into a holder and exposed to 30 mJ coherent 364.8 nm UV laser light from an argon ion laser through the other prism leg normal incidence to said leg. After exposure, the plate containing the quarter and the black absorber is removed. The exposed HRF-700×318-20 film is optically stopped by a 100 mJ exposure to a UV-A extended light-source.

A H2 is then recorded by laminating a holographic replication film, DuPont HRF-600×130-7, a 7 μm transmission replication film with a black absorbing base (or other UV sensitive film), to the glass plate opposite the prism face. The plate was placed into the holder of a Lloyd's mirror recording set-up and exposed through both legs of the prism at incidence normal using the 364.8 nm coherent UV laser-line of an argon ion laser. Exposure is 20 mJ and then UV stopped as described. The film is post-exposure processed by heating for two hours at 150° C. The black absorbing base is removed and the processed hologram is laminated with a pressure-sensitive adhesive, 3M-8141 (3M, 3M Center, Saint Paul, Minn., USA) to a 4"×5" glass plate for evaluation.

The evaluation of the hologram would be illuminating the hologram with a variety of light sources at various angles both with and without a prism. Without a prism, the hologram was illuminated using a white broadband extended source, a white broadband point source and a UV LED. In all conditions the holographic image of the quarter was neither visible nor recognizable. The evaluation with a prism was completed by optically coupling a prism like the prism used for recording the hologram by using a couple of drops of water as a wetting fluid. Using the same light sources, the holographic image of the quarter would visible and recognizable with a UV point source or UV extended source and using an imaging system capable of capturing UV images and converting to a visible image on a display or other reader. The results are compiled in Table 2.

TABLE 2

| Illumination Source | Prism | Evaluation |
| --- | --- | --- |
| White Extended Source | No | Neither visible nor recognizable |
| White Point Source | No | Neither visible nor recognizable |
| UV LED | No | Neither visible nor recognizable |
| White Extended Source | Yes | Neither visible nor recognizable |
| White Point Source | Yes | Neither visible nor recognizable |
| UV LED | Yes | Visible only with an imaging system capable of capturing UV wavelengths and converting to a visible image on a display or other reader |

Example 4

Prophetic

A H1 is holographically recorded using a quarter (coin, US currency or other object) secured to a 4"×5" glass plate using Norland NOA-61 Optical Adhesive (Norland Products, 2540 Route 130, Suite 100, Cranbury, N.J., USA). The face (longest of the three sides side) of a right-angle prism, Edmund OpticsP32-551 30 mm right-angle prism (Edmund Optics, 101 East Gloucester Pike, Barrington, N.J., USA), is secured to the center area of another glass plate using NOA-61. The exposed area of the glass plate around the prism is masked as well as the sides of the prism. A piece of holographic recording film, DuPont HRF-700×318-2, a 20 μm panchromatic holographic mastering film with a barrier layer (DuPont, 1007 Market Street, Wilmington, Del., USA) (or other IR sensitive film), is hand-laminated to one leg of the prism. A black absorbing film is optically coupled to the air-side of the film using several drops of Cargille Immersion Liquid 5095 (Cargille Laboratories, Inc., 55 Commerce Road, Cedar Grove, N.J., USA). The glass plate with the quarter attached is then optically coupled to the prism/glass plate on the opposite side of the face. This stack is placed into a holder and exposed to 30 mJ coherent 870 nm line from a IR semiconductor laser through the other prism leg normal incidence to said leg. After exposure, the plate containing the quarter and the black absorber is removed. The exposed HRF-700×318-20 film is optically stopped by a 100 mJ exposure to a UV-A extended light-source.

A H2 is then recorded by laminating a holographic replication film, DuPont HRF-600×130-7, a 7 μm transmission replication film with a black absorbing base (or other IR sensitive film), to the glass plate opposite the prism face. The plate was placed into the holder of a Lloyd's mirror recording set-up and exposed through both legs of the prism at incidence normal using the 870 nm coherent IR laser-line of a semiconductor laser. Exposure is 20 mJ and then UV stopped as described. The film is post-exposure processed by heating for two hours at 150° C. The black absorbing base is removed and the processed hologram is laminated with a pressure-sensitive adhesive, 3M-8141(3M, 3M Center, Saint Paul, Minn., USA) to a 4"×5" glass plate for evaluation.

The evaluation of the hologram would be illuminating the hologram with a variety of light sources at various angles both with and without a prism. Without a prism, the hologram was illuminated using a white broadband extended source, a white broadband point source and a IR LED or other IR source. In all conditions the holographic image of the quarter was neither visible nor recognizable. The evaluation with a prism was completed by optically coupling a prism like the prism used for recording the hologram by using a couple of drops of water as a wetting fluid. Using the same light sources, the holographic image of the quarter would visible and recognizable with a IR point source or IR extended source and using an imaging system capable of capturing UV images and verting to a visible image on a display or other reader. The results are compiled in Table 3.

TABLE 3

| Illumination Source | Prism | Evaluation |
|---|---|---|
| White Extended Source | No | Neither visible nor recognizable |
| White Point Source | No | Neither visible nor recognizable |
| UV LED | No | Neither visible nor recognizable |
| White Extended Source | Yes | Neither visible nor recognizable |
| White Point Source | Yes | Neither visible nor recognizable |
| IR LED | Yes | Visible only with an imaging system capable of capturing IR wavelengths and converting to a visible image on a display or other reader |

What is claimed is:

1. A method for making a security hologram comprising a covert image of an object, said method comprising the steps of:
   a) placing the object in contact with a first face of a prism, placing a first photosensitive film in contact with a second face of the prism, and holographically exposing the object, the prism and the first photosensitive film to a first coherent beam of electromagnetic radiation that is incident upon a third face of the prism wherein the first photosensitive film results in a first exposed photosensitive film having a H1 hologram of the object;
   b) curing the first exposed photosensitive film with electromagnetic radiation resulting in a first cured photosensitive film and removing the object from being proximate to the prism; and
   c) placing a second photosensitive film in contact with the first face of the prism, exposing the first cured photosensitive film, the prism and the second photosensitive film to a second coherent beam of electromagnetic radiation that is incident upon the third face of the prism wherein the second photosensitive film results in a second exposed photosensitive film having a H2 hologram, and curing the second photosensitive film with electromagnetic radiation resulting in a second cured photosensitive film, wherein the holographic imaging in step c) is effected using a single coherent beam of electromagnetic radiation in combination with a Lloyd's mirror to provide both reference and object beams.

2. The method of claim 1 further comprising the step of:
   a) removing the first cured photosensitive film from being proximate to the prism, placing a third photosensitive film in contact with the exposed and cured second photosensitive film containing the H2 hologram, and exposing the second cured photosensitive film, the prism and the third photosensitive film to coherent electromagnetic radiation replicating the H2 hologram of the object.

3. A security hologram produced by the method of claim 1.

* * * * *